US011248951B2

(12) United States Patent
Schmid et al.

(10) Patent No.: US 11,248,951 B2
(45) Date of Patent: Feb. 15, 2022

(54) SENSOR DEVICE INCLUDING A SENSOR FOR CARRYING OUT SURROUNDING-AREA MONITORING WITH THE AID OF SONIC WAVES

(71) Applicant: Robert Bosch GmbH, Stuttgart (DE)

(72) Inventors: Dirk Schmid, Simmozheim (DE); Karl-Heinz Richter, Weil der Stadt (DE); Martin Reiche, Weil der Stadt (DE); Michael Frank, Bretten (DE); Peter Preissler, Dorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 16/488,820

(22) PCT Filed: Jan. 11, 2018

(86) PCT No.: PCT/EP2018/050654
§ 371 (c)(1),
(2) Date: Aug. 26, 2019

(87) PCT Pub. No.: WO2018/153562
PCT Pub. Date: Aug. 30, 2018

(65) Prior Publication Data
US 2021/0131862 A1    May 6, 2021

(30) Foreign Application Priority Data
Feb. 27, 2017 (DE) .......................... 102017203136.0

(51) Int. Cl.
*G01H 3/00* (2006.01)
*G01H 15/00* (2006.01)
(Continued)

(52) U.S. Cl.
CPC ............ *G01H 3/005* (2013.01); *B06B 1/0207* (2013.01); *G01H 15/00* (2013.01); *G01N 29/00* (2013.01);
(Continued)

(58) Field of Classification Search
CPC ........ G01H 3/005; G01H 15/00; G01S 7/524; G01S 15/931; B06B 1/0215;
(Continued)

(56) References Cited

U.S. PATENT DOCUMENTS 2,899,563 A    8/1959  Stellmacher et al.
2003/0024298 A1*  2/2003  Baber ................... G01L 25/00
                                              73/1.82
(Continued)

FOREIGN PATENT DOCUMENTS

DE    102008042820 A1    4/2010
DE    102014201482 A1    7/2015
(Continued)

OTHER PUBLICATIONS

Translation JP-07140242-A (Year: 1993).*
(Continued)

*Primary Examiner* — Alexander A Mercado
*Assistant Examiner* — Monica S Young
(74) *Attorney, Agent, or Firm* — Norton Rose Fulbright US LLP; Gerard A. Messina

(57) ABSTRACT

A sensor device, including a sensor having a sound transducer to emit sonic waves and convert received sonic waves to electrical signals. A sensor evaluation unit carries out surrounding-area monitoring during a normal operation of the sensor, by evaluating electrical signals of the sound transducer. During a monitoring mode of the sensor, a monitoring unit of the sensor device measures an impedance of the sound transducer for different excitation frequencies
(Continued)

of excitation signals produced with a signal generator of the sensor device. The sensor device includes a first and a second signal path, which are each connected to the sound transducer and are connectable to the signal generator. To reset the sensor from normal operation to the monitoring mode, a first control unit of the sensor device is configured to decouple the signal generator from the first signal path and to connect it to the second signal path.

9 Claims, 1 Drawing Sheet

(51) Int. Cl.
  *B06B 1/02* (2006.01)
  *G01N 29/00* (2006.01)
  *G01S 7/524* (2006.01)
  *B06B 1/06* (2006.01)
  *H04R 25/00* (2006.01)
  *G10K 15/04* (2006.01)
(52) U.S. Cl.
  CPC ........... *B06B 1/0215* (2013.01); *B06B 1/0614* (2013.01); *G01S 7/524* (2013.01); *G10K 15/046* (2013.01); *H04R 25/305* (2013.01)
(58) Field of Classification Search
  CPC .. B06B 1/0614; B06B 1/0207; G10K 15/046; H04R 25/305
  USPC ....................................................... 73/1, 324
  See application file for complete search history.

(56) References Cited

U.S. PATENT DOCUMENTS

| | | | |
|---|---|---|---|
| 2004/0194532 A1* | 10/2004 | Lally | G01L 25/00 73/1.82 |
| 2007/0258598 A1* | 11/2007 | Bai | H04R 29/004 381/58 |
| 2008/0319692 A1 | 12/2008 | Davis et al. | |
| 2012/0017684 A1* | 1/2012 | Reiche | G01H 3/005 73/589 |
| 2013/0170659 A1* | 7/2013 | Guanziroli | H04R 29/001 381/59 |

FOREIGN PATENT DOCUMENTS

| | | | |
|---|---|---|---|
| EP | 2899563 A1 * | 7/2015 | ......... G01S 7/52004 |
| EP | 2899563 A1 | 7/2015 | |
| JP | S63145982 A | 6/1988 | |
| JP | 07140242 A * | 6/1995 | |
| JP | H07140242 A | 6/1995 | |
| JP | 2001235538 A | 8/2001 | |
| JP | 200790139 A | 4/2007 | |
| WO | 2008141663 A1 | 11/2008 | |

OTHER PUBLICATIONS

Translation EP-2899563-A1 (Year: 2015).*
International Search Report for PCT/EP2018/050654, dated May 4, 2018.

* cited by examiner

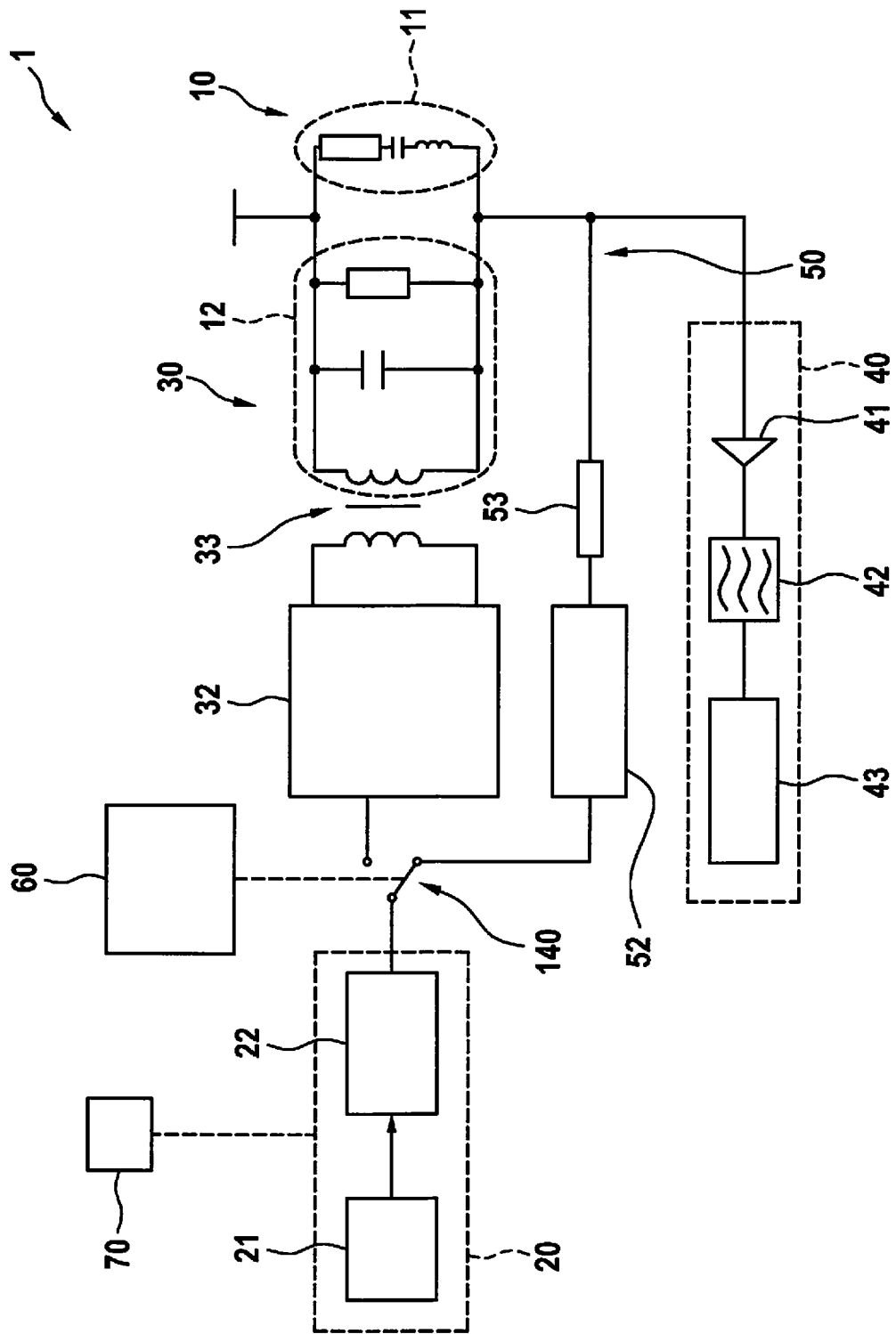

SENSOR DEVICE INCLUDING A SENSOR FOR CARRYING OUT SURROUNDING-AREA MONITORING WITH THE AID OF SONIC WAVES

FIELD OF THE INVENTION

The present invention relates to a sensor device, which includes a sensor for emitting sonic waves and for carrying out surrounding-area monitoring with the aid of sonic waves. The sensor device further includes a monitoring unit for measuring an impedance of the sensor. The present invention further relates to a method for monitoring a sensor of such a sensor device.

BACKGROUND INFORMATION

Patent document DE 10 2008 042 820 A1 discusses a sensor device, which includes a sensor for carrying out surrounding-area monitoring with the aid of sonic waves. The sensor has devices for generating and detecting sonic waves. The sensor device further includes a function monitoring device for checking a functional state of the sensor, using an impedance characteristic of the sensor. The function monitoring device is configured to carry out an impedance measurement, in which the impedance characteristic of the sensor is ascertained as a function of an excitation frequency. During the impedance measurement, the sensor is excited at an amplitude lower than during normal operation of the sensor.

SUMMARY OF THE INVENTION

According to the present invention, a sensor device including a sensor, a signal generator and a monitoring unit is provided. In this context, the sensor includes a sound transducer and an evaluation unit. The sound transducer is configured to emit sonic waves as a result of excitation by electrical excitation signals produced with the aid of the signal generator, and to convert received sonic waves to electrical signals. The evaluation unit of the sensor is configured to carry out surrounding-area monitoring during normal operation of the sensor, by evaluating electrical signals of the sound transducer. During a monitoring mode of the sensor, the monitoring unit is configured to measure an impedance of the sound transducer for different excitation frequencies of the excitation signals. The sensor device has a first signal path, which is connected to the sound transducer and is connectable to the signal generator. The sensor device further includes a second signal path, which is connected to the sound transducer and is connectable to the signal generator. The sensor device further includes a first control unit, which is configured to decouple the first signal path from the signal generator and to connect the second signal path to the signal generator, in order to reset the sensor from normal operation to monitoring mode.

In other words, the sound transducer is connected to the signal generator via the first signal path during normal operation and via the second signal path during the monitoring mode. Since, during the monitoring mode, the sound transducer is connected to the signal generator via a signal path different from during normal operation, an impedance measurement to be carried out during the monitoring mode may be optimized. During the above-mentioned impedance measurement, the impedance of the sound transducer is measured for different excitation frequencies of the excitation signals. This optimization may be achieved by selecting a suitable configuration of the second signal path. The configuration of the second signal path may be adapted specifically to the impedance measurement to be carried out during monitoring mode, without having to consider, in the process, requirements, which prevail during surrounding-area monitoring carried out during normal operation.

The further embodiments include further refinements of the present invention.

The sensor device described above may include a plurality of sensors, which are each provided in the sensor device in the same manner as the sensor described above.

According to a further refinement of the present invention, the first signal path and the second signal path of a sensor device described above constitute two signal paths completely different from each other. The selection of completely different configurations of the two signal paths may allow an amplitude of the excitation signals during the monitoring mode and, consequently, during the impedance measurement, to be set independently of the amplitude of the excitation signals during normal operation and, consequently, during the surrounding-area monitoring, as well. Thus, the amplitude of the excitation signals during the impedance measurement may differ from the amplitude of the excitation signals during the surrounding-area monitoring by one or more orders of magnitude or powers of ten. In particular, the configuration of the second signal path may be selected in such a manner, that the amplitude of the excitation signals during the monitoring mode is one or more orders of magnitude or powers of ten less than the amplitude of the excitation signals during normal operation. Here, it should be taken into account that an order of magnitude corresponds to a power of ten.

In one case, in which the amplitude of the excitation signals during the monitoring mode is less than the amplitude of the excitation signals during normal operation by at least one order of magnitude or power of ten, sonic waves having significant power are prevented from being emitted during the impedance measurement. In this manner, the sonic waves emitted during the impedance measurement are prevented from interfering with the normal operation of one or more adjacent sensors. In other words, in this manner, the impedance measurement may be carried out in one or more sensors of a sensor device described above at the same time as one or more adjacent sensors of the specific sensor device are emitting sonic waves for monitoring the surrounding area.

According to one further refinement of the present invention, a sensor device described above includes a switch element, which has a first and a second switching state and may be set to the first and second switching states with the aid of the first control unit. The switch element is configured to connect the first signal path to the signal generator in the first switching state, and to connect the second signal path to the signal generator in the second switching state. In this manner, one may switch between normal operation and the monitoring mode in a simple manner.

According to one further refinement of the present invention, the second signal path of an above-described sensor device includes an impedance output stage and a resistor. In this manner, the second signal path may be implemented through the use of a few inexpensive components, which may be integrated, for the most part, in an application-specific, integrated circuit that is already present in the specific sensor device and is also referred to as an ASIC.

According to one further refinement of the present invention, an input of the impedance output stage of the second signal path of an above-described sensor device is connectable to the signal generator. In addition, an output of the same impedance output stage is connected to the sound transducer via the resistor of the second measuring path of the specific sensor device.

According to one further refinement of the present invention, the resistor of the second signal path of an above-described sensor device is manufactured to be highly resistive and may have a resistance value of at least $1 \cdot 10^5 \Omega$. The resistor of the second signal path may have a resistance value of $2 \cdot 10^5 \Omega$.

In a case, in which the resistance of the second signal path of a sensor device described above is manufactured to be highly resistive, only a current having very low current values may flow via the second signal path. Depending on the selection of the resistance value of the resistor manufactured to be highly resistive, it may be provided that during the monitoring mode, an amplitude of the excitation signals produced with the aid of the signal generator be less than during normal operation, in particular, one or more orders of magnitude or powers of ten less. This prevents a significant amount of sound radiation during the monitoring mode and, consequently, during the impedance measurement, as well.

In the case, in which the resistor of the second signal path of a sensor device mentioned above is manufactured to be highly resistive, and in which only a current having very low current values may consequently flow via the second signal path, the impedance output stage of the second signal path of a sensor device described above is only loaded very little. Therefore, in such a case, the impedance output stage may be manufactured to be very small. In addition, in such a case, an input amplifier may be contained by the monitoring unit of an above-mentioned sensor device for amplifying a voltage applied to the sound transducer is not overloaded. Furthermore, in such a case, the normal operation of the sensor may not be influenced by the second signal path, since only a parasitic current having very low current values may flow via the second signal path.

According to a further refinement of the present invention, a sensor device described above includes a second control unit. The second control unit is configured to control the signal generator in such a manner, that during the monitoring mode, the excitation signals produced with the aid of the signal generator each have a lower amplitude, in particular, an amplitude at least one order of magnitude or power of ten lower, than during normal operation.

A further aspect of the present invention relates to a method for monitoring a functional state of a sensor of a sensor device described above. The method includes resetting the sensor from normal operation to the monitoring mode, by decoupling the first signal path from the signal generator and connecting the second signal path to the signal generator. The method further includes measuring the impedance of the sound transducer for different excitation frequencies of the excitation signals produced with the aid of the signal generator.

The method described above may include controlling the signal generator in such a manner, that during the monitoring mode, the excitation signals produced with the aid of the signal generator each have a lower amplitude, in particular, an amplitude at least one order of magnitude or power of ten lower, than during normal operation.

In the following, an exemplary embodiment of the present invention is described in detail with reference to the accompanying drawing. In each instance, identical reference numerals are used for the same components.

BRIEF DESCRIPTION OF THE DRAWING

FIG. 1 shows a block diagram of a sensor device according to a first specific embodiment of the present invention.

DETAILED DESCRIPTION

FIG. 1 shows a block diagram of a sensor device 1 according to a first specific embodiment of the present invention. Sensor device 1 includes a sensor having a sound transducer 10 and an evaluation unit (not shown). Sensor device 1 further includes a signal generator 20 and a first signal path 30. Sound transducer 10 is configured to emit sonic waves as a result of excitation by electrical excitation signals generated with the aid of signal generator 20, and to convert received sonic waves to electrical signals. During a normal operation of the sensor, in which sound transducer 10 is connected to signal generator 20 via a first signal path 30 of sensor device 1, the evaluation unit of the sensor is configured to carry out surrounding-area monitoring by evaluating electrical signals of sound transducer 10.

First signal path 30 is connected to sound transducer 10 and is connectable to signal generator 20 by a switch 140 situated in sensor device 1. First signal path 30 includes a power amplifier 32 and a transformer 33. In this context, an input of power amplifier 32 is connectable to signal generator 20 via switch 140. In addition, an output of power amplifier 32 is connected to sound transducer 10 via transformer 33.

In an equivalent circuit diagram, sound transducer 10 may be represented as a series resonant circuit 11. In addition, an electrical circuit of sound transducer 10 may be represented as a parallel-resonant circuit 12, via which series resonant circuit 11 is connected to transformer 33. In this context, series resonant circuit 11 is connected in parallel with parallel-resonant circuit 12.

Signal generator 20 includes an oscillator 21 for generating a necessary excitation frequency and a frequency divider 22 for generating different excitation frequencies of the excitation signals. In this context, an input of frequency divider 22 is connected to oscillator 21. In addition, an output of frequency divider 22 is connectable to power amplifier 32 of first signal path 30 via switch 140.

Furthermore, sensor device 1 includes a monitoring unit 40, which is configured to carry out an impedance measurement during a monitoring mode of the sensor, in which sound transducer 10 is connected to signal generator 20 via a second signal path 50 of sensor device 1. During the impedance measurement, an impedance of sound transducer 10 is measured by monitoring unit 40, for different excitation frequencies of the excitation signals produced with the aid of signal generator 20. To that end, monitoring unit 40 includes an input amplifier 41, a band-pass filter 42 connected in outgoing circuit, and a subsequent evaluation unit 43. In this context, an input of input amplifier 41 is connected to sound transducer 10. In addition, an output of input amplifier 41 is connected to evaluation unit 43 of monitoring device 40 via band-pass filter 42.

In order to carry out the impedance measurement of the sound transducer, a voltage applied to sound transducer 10 is measured. To that end, a tap is formed in series resonant circuit 11 of sound transducer 10. In addition, the voltage applied to sound transducer 10 is supplied to evaluation unit 43 of monitoring device 40 via input amplifier 41 and band-pass filter 42. A voltage value of this voltage is then ascertained with the aid of evaluation unit 43 of monitoring device 40. The impedance of sound transducer 10 is then calculated as the quotient of the ascertained voltage value and a known value of a current flowing through sound transducer 10.

Second signal path 50 is connected to sound transducer 10 and connectable to signal generator 20 via switch 140. Second signal path 50 includes an impedance output stage 52 and a resistor 53. In this context, an input of impedance output stage 52 is connectable to signal generator 20 via switch 140. In addition, an output of impedance output stage 52 is connected to sound transducer 10 via resistor 53.

Switch 140 has a first switching position, in which signal generator 20 is connected to first signal path 30 and decoupled from second signal path 50. Switch 140 also has a second switching position, in which signal generator 20 is decoupled from first signal path 30 and connected to second signal path 50.

In order to reset the sensor from normal operation to the monitoring mode, sensor device 1 includes a first control unit 60, which is configured to actuate switch 140 from the first switching position to the second switching position and thereby decouple signal generator 20 from first signal path 30 and connect it to second signal path 50.

To activate the monitoring mode, that is, the impedance measurement, first control unit 60 generates a switching signal, which disconnects frequency divider 22 of signal generator 20 from the input of power amplifier 32 of first signal path 30 and directs it to the input of impedance output stage 52 of second signal path 50.

In order to reset the sensor from the monitoring mode to normal operation, first control unit 60 is further configured to actuate switch 140 from the second switching position to the first switching position and thereby decouple first signal generator 20 from second signal path 50 and connect it to first signal path 30.

First control unit 60 may be integrated in an application-specific, integrated circuit, which is also referred to as an ASIC and is already present in sensor device 1.

In the present invention, first signal path 30, which is to be used during normal operation and includes power amplifier 32 along with post-connected transformer 33, is not used for generating the excitation signals during the monitoring mode and, consequently, during the impedance measurement. In the present invention, impedance output stage 52 of second signal path 50, whose output is connected directly to sound transducer 10 via resistor 53, is used for generating the excitation signals during the monitoring mode and, consequently, during the impedance measurement.

Impedance output stage 52 of second signal path 50 may be manufactured, using a complementary technology, which employs metal-oxide semiconductors and is also referred to as CMOS technology, and may easily be integrated in an ASIC. Resistor 53 may be manufactured to be highly resistive, and its value may be approximately $2 \cdot 10^5 \Omega$. Typical voltage values of an output voltage of the second signal path 50 implemented in this manner lie in a range of values extending between 0 V and 5 V. Typical values of a current flowing through the second signal path 50 implemented in this manner lie below a value of $1 \cdot 10^{-4}$ A and could not be generated by power amplifier 32 of first signal path 30 in combination with transformer 33. The use of a second signal path 50, through which only a current having such small current values may flow, has many advantages. A first of these advantages is that a significant amount of sound radiation is prevented during the monitoring mode and, consequently, during the impedance measurement, as well. A second of these advantages is that input amplifier 41 of monitoring unit 40 is not overloaded during the monitoring mode and, consequently, during the impedance measurement, as well. A third of these advantages is that impedance output stage 52 of second signal path 50 is loaded only very little and may therefore be configured to be very small. A fourth of these advantages is that the normal operation of the sensor may not be influenced by second signal path 50, since only a parasitic current having a very low current value may flow through highly resistive resistor 53 of second signal path 50.

Sensor device 1 may include a second control unit 70. Second control unit 70 is configured to control signal generator 20 in such a manner, that the excitation signals produced by signal generator 20 each have a lower amplitude during the monitoring mode than during normal operation. In this context, during the monitoring mode, the excitation signals produced by signal generator 20 each have, in particular, an amplitude at least one order of magnitude or power of ten lower than during normal operation.

Besides the written description above, for the further description of the present invention, reference is additionally made to the representation in FIG. 1.

What is claimed is:
1. A sensor device, comprising:
   a sensor;
   a signal generator;
   a monitoring unit; and
   a first control unit;
   wherein a sound transducer of the sensor is configured to emit sonic waves as a result of excitation of the sound transducer by electrical excitation signals produced with the signal generator, and to convert received sonic waves to electrical signals;
   wherein an evaluation unit of the sensor is configured to carry out surrounding-area monitoring during a normal operation of the sensor, by evaluating electrical signals of the sound transducer;
   wherein during a monitoring mode of the sensor, the monitoring unit is configured to measure an impedance of the sound transducer for different excitation frequencies of the excitation signals;
   wherein a first signal path and a second signal path are each connected to the sound transducer, and each are connectable to the signal generator, the first signal path including an amplifier, and the second signal path including an impedance output stage and a resistor;
   wherein the first control unit is configured to disconnect the first signal path from the signal generator and to connect the second signal path to the signal generator, so as to reset the sensor from the normal operation to the monitoring mode and in such a manner that the sound transducer receives the excitation signals via the second signal path and not via the first signal path, and the first control unit is configured to disconnect the second signal path from the signal generator and to connect the first signal path to the signal generator so as to reset the sensor from the monitoring mode to the normal operation and in such a manner that the sound transducer receives the excitation signals via the first signal path and not via the second signal path.

2. The sensor device of claim 1, wherein the first signal path and the second signal path constitute two signal paths completely different from each other.

3. The sensor device of claim 1, further comprising:
a switch element, which has a first switching state and a second switching state, configured to be settable to the first switching state and second switching state with the first control unit, and configured to connect the first signal path to the signal generator in the first switching state and to connect the second signal path to the signal generator in the second switching state.

4. The sensor device of claim 1, wherein an input of the impedance output stage is connectable to the signal generator, and wherein an output of the impedance output stage is connected to the sound transducer via the resistor.

5. The sensor device of claim 1, further comprising: a second control unit, which is configured to control the signal generator so that during the monitoring mode, the excitation signals produced with the signal generator each have a lower amplitude, the lower amplitude at least one power of ten lower than during normal operation.

6. The sensor device of claim 1, wherein the resistor of the second signal path is manufactured to be highly resistive, which is a resistance value of at least $1 \times 10^5 \Omega$.

7. A method for monitoring a functional state of a sensor of a sensor device, the method comprising:
resetting the sensor from the normal operation to the monitoring mode, by disconnecting the first signal path from the signal generator and connecting the second signal path to the signal generator in such a manner that the sound transducer receives the excitation signals via the second signal path; and
measuring the impedance of the sound transducer for different excitation frequencies of the excitation signals produced with the signal generator;
wherein the sensor device includes:
a sensor;
a signal generator;
a monitoring unit; and
a first control unit;
wherein a sound transducer of the sensor is configured to emit sonic waves as a result of excitation of the sound transducer by electrical excitation signals produced with the signal generator, and to convert received sonic waves to electrical signals;
wherein an evaluation unit of the sensor is configured to carry out surrounding-area monitoring during a normal operation of the sensor, by evaluating electrical signals of the sound transducer;
wherein during a monitoring mode of the sensor, the monitoring unit is configured to measure an impedance of the sound transducer for different excitation frequencies of the excitation signals;
wherein a first signal path and a second signal path are each connected to the sound transducer and each are connectable to the signal generator, the first signal path including an amplifier, and the second signal path including an impedance output stage and a resistor;
wherein the first control unit is configured to disconnect the first signal path from the signal generator and to connect the second signal path to the signal generator, so as to reset the sensor from normal operation to a monitoring mode and in such a manner that the sound transducer receives the excitation signal via the second signal path and not via the first signal path, and the first control unit is configured to disconnect the second signal path from the signal generator and to connect the first signal path to the signal generator, so as to reset the sensor from the monitoring mode to the normal operation and in such a manner that the sound transducer receives the excitation signals via the first signal path and not via the second signal path.

8. The method of claim 7, further comprising:
controlling the signal generator so that during the monitoring mode, the excitation signals produced with the signal generator each have a lower amplitude than during normal operation.

9. The method of claim 7, further comprising:
controlling the signal generator so that during the monitoring mode, the excitation signals produced with the signal generator each have a lower amplitude, which is an amplitude at least one power of ten lower, than during normal operation.

* * * * *